Aug. 26, 1958   J. R. CAMPBELL   2,849,575
THERMOSTATIC CONTROL
Filed Jan. 14, 1957   2 Sheets-Sheet 1

JAMES R. CAMPBELL,
INVENTOR.

BY
Thomas P. Maloney
ATTORNEY.

Aug. 26, 1958  J. R. CAMPBELL  2,849,575
THERMOSTATIC CONTROL
Filed Jan. 14, 1957  2 Sheets-Sheet 2
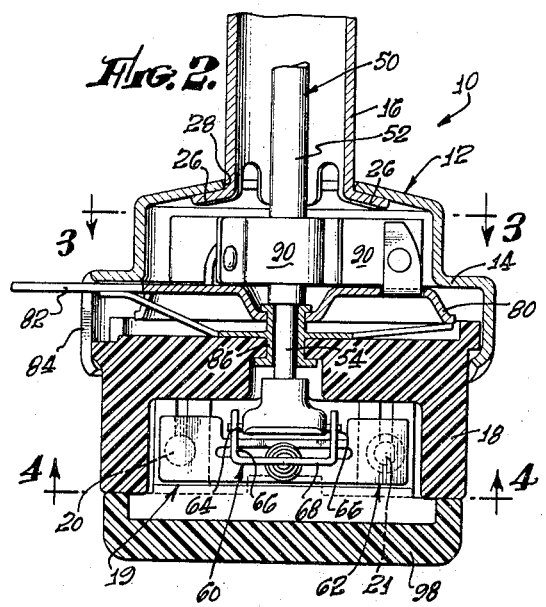
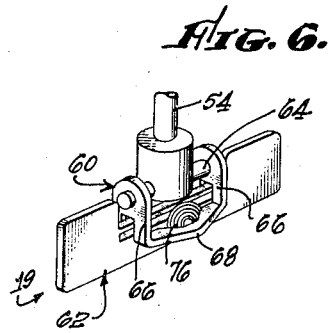
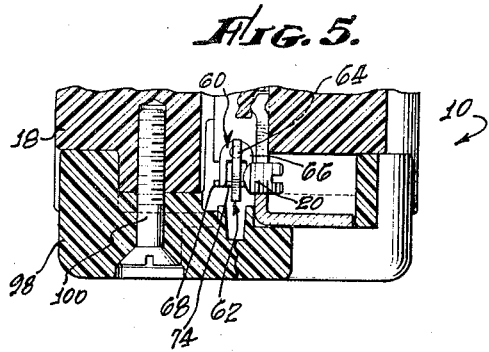
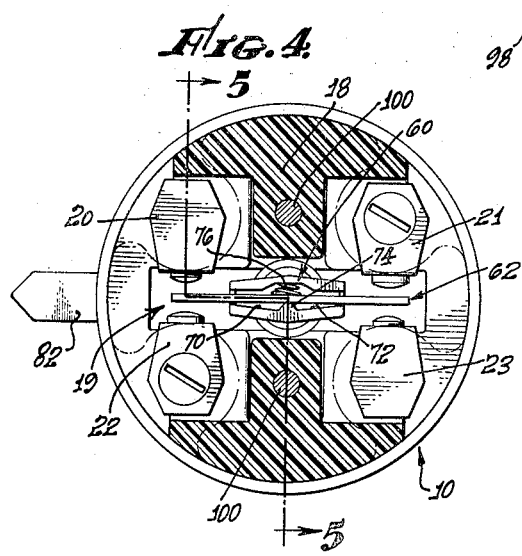
JAMES R. CAMPBELL,
INVENTOR.
BY Thomas P. Mahoney
ATTORNEY.

United States Patent Office 2,849,575
Patented Aug. 26, 1958

2,849,575

THERMOSTATIC CONTROL

James R. Campbell, Laguna Beach, Calif.

Application January 14, 1957, Serial No. 634,029

15 Claims. (Cl. 200—138)

This invention relates to a thermostatic control adapted for use in conjunction with a wide variety of appliances to determine and control the functioning thereof.

The control of my invention incorporates a sensing element constituted by an elongated, helically wound, bimetallic strip which is located in a tubular section of a housing and which is exposed to the fluid whose temperature is to be detected by said sensing element.

Associated with the sensing element is an elongated shaft member which has an extremity connected to the sensing element and its other extremity mounting a switch carriage thereupon.

Located intermediate the extremities of the shaft and impinging thereupon are snap spring means which are so constructed that they tend to resist the torque exerted upon the shaft by the sensing element and which may be set to a desired extent which will cause the energization of a switch in which a switch element is located when a predetermined torque is exerted upon the shaft by the sensing element.

In conventional devices of the character of that under consideration here no definite relationship is established between the torque exerted by the sensing element and the switch energized thereby, whereas in the construction of my invention the provision of the snap spring means to resist the energizing action of the sensing element causes a snap action to be attained which is not encountered in devices of conventional designs.

It is, therefore, an object of my invention to provide a thermostatic control which is characterized by the close limits within which it may be set, said close setting limits being attributable to the inter-relationship established between the torque exerted by the helically wound bimetallic sensing element and the resistance to said torque exerted by the snap acting spring means associated with the switch actuating shaft upon which the sensing element exerts its torque.

An additional object of my invention is the provision of a thermostatic control wherein the inherent relationship between the sensing element and the switch energizing snap spring means is such that extremely rapid and precise movement of the switch element incorporated in the switch is achieved, thus assuring clean breaking and making of contacts and eliminating arcing and other deleterious phenomena encountered in conventional constructions.

Another object of my invention is the provision of a thermostatic control which is characterized by its relatively frictionless operation. This is attributable to the fact that the shaft connecting the sensing element and the switch element is suspended for movement between said elements with no intervening supports or bearings.

Another object of my invention is the provision of a control of the aforementioned character wherein the switch incorporated in the control includes temperature responsive means whereby the action of the temperature sensing element included in the control can be affected by said temperature responsive means.

An additional object of my invention is the provision, in a device of the aforementioned character, of a switch element carriage which is pivotally mounted upon the actuating shaft of the device and which includes a receptacle for the reception of the switch element, the switch element being mounted in said receptacle for movement relative thereto. Thus, the switch element is characterized by its rapid making and breaking of contacts because of the substantial inertia achieved by the rotation of the carriage prior to the making and breaking of said contacts by the switch element itself, in a manner to be described in greater detail below.

It is well known to those skilled in the art that the thermostatic control business is highly competitive and that even the most minor economies in the manufacture and assembly of such elements assume extreme economic significance. An associated object of my invention is the provision of a thermostatic control element of the aforementioned character which can be easily and cheaply assembled and which is characterized by its relatively small housing size with resulting economies in the expenditures for sheet metal and the like.

Also characteristic of my invention is the economical assembly of the component parts thereof. Particular reference is made to the provision of means for connecting the helical sensing element in operative relationship with the tubular enclosure therefor. The connecting means includes a yoke which is secured to the outer extremity of the helical sensing element and which is engageable with detent means provided on the tubular portion of the housing by a relatively simple assembly operation.

Other objects and advantages of my invention will be apparent from the following specification and the accompanying drawings which are for the purpose of illustration only and in which:

Fig. 2 is a vertical, sectional view taken on the broken line 2—2 of Fig. 1;

Fig. 4 is a transverse, sectional view taken on the broken line 4—4 of Fig. 2;

Fig. 5 is an enlarged, fragmentary, sectional view taken on the broken line 5—5 of Fig. 4;

Fig. 6 is a perspective view of the switch element carriage and the switch element mounted therein;

Figure 1:
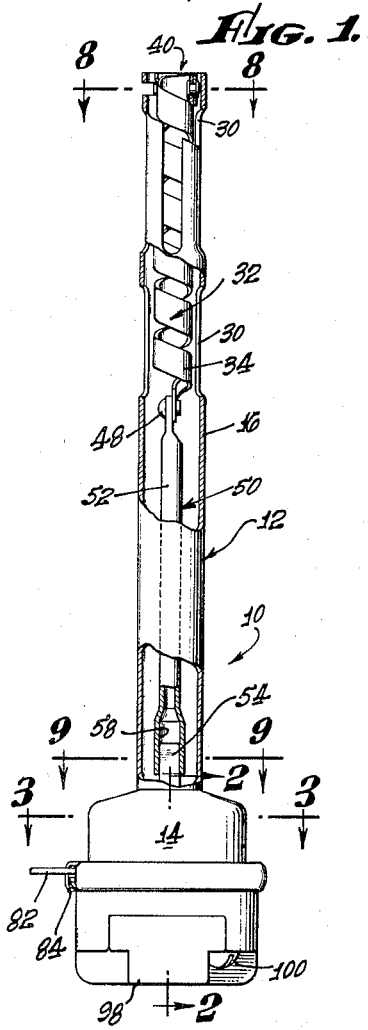
Fig. 1 is a vertical, partly sectional view of a thermostatic control constructed in accordance with the teachings of my invention.

Referring to the drawings and particularly to Figs. 1–4 thereof, I show a thermostatic control element 10 constructed in accordance with the teachings of my invention and including a housing 12, said housing being constituted by a switch enclosing portion 14 of substantially cylindrical configuration and an elongated tubular portion 16 affixed to the upper extremity of said switch enclosing portion.

Fastened within the switch enclosing portion 14 of the housing 12 is a terminal and contact mounting block 18 of a switch 19, said block being formed from phenolic plastic, or other material characterized by its suitable insulating quality and there is mounted in said block a plurality of contacts 20, 21, 22, and 23, as best shown in Fig. 4 of the drawings.

Figure 7:
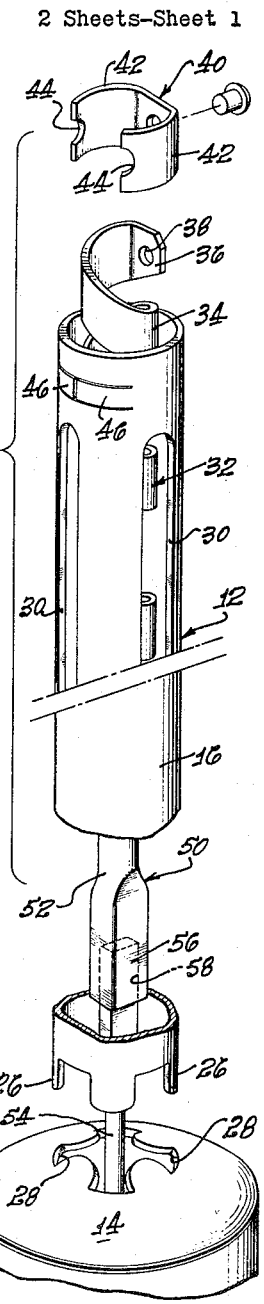
Fig. 7 is an exploded view showing the various components of the thermostatic control of my invention.

The elongated tubular portion 16 of the housing 12 is provided upon its lower extremity, as best shown in Fig. 7 of the drawings, with a plurality of tabs 26 receivable in suitable openings 28 formed in the switch enclosing portion of the housing 12. A plurality of elongated slots 30 may be provided in the wall of the tubular portion 16 of the housing 12 to facilitate the flow of fluid over an elongated sensing element 32 which is constituted by a helically wound, bimetallic strip 34.

Figure 8:
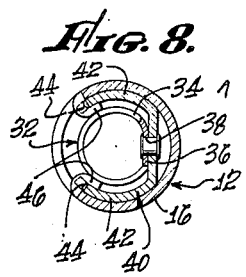
Fig. 8 is a transverse, sectional view taken on the broken line 8—8 of Fig. 1.

The upper extremity of the strip 34 has a flat 36 provided thereupon with an opening 38 therein. Affixed to the upper extremity of the strip 34 is a substantially U-shaped yoke 40, the legs 42 of which are arcuately configured to conform to the arcuate configuration of the portions of the wall of the tubular portion 16 of the housing 12 contiguous thereto, as best shown in Figs. 7 and 8 of the drawings. Moreover, the extremities of the legs 42 are provided with notches 44, said notches being adapted to receive, as best shown in Fig. 8 of the drawings, a pair of opposed, inwardly bent prongs 46 punched out of the side wall of the tubular portion 16 of the housing 12. It is obvious that the provision of the yoke 40 whose legs 42 are engageable by integral prongs 46 of the tubular portion 16 of the housing 12 materially reduces the assembly costs inherent in the affixation of the helical sensing element 32 in operative relationship with the tubular portion 16 of the housing 12 and also insures that positive securement of said helical sensing element will be maintained during the life of the control 10.

Figure 9:
Fig. 9 is a transverse, sectional view taken on the broken line 9—9 of Fig. 1.
Figure 3:
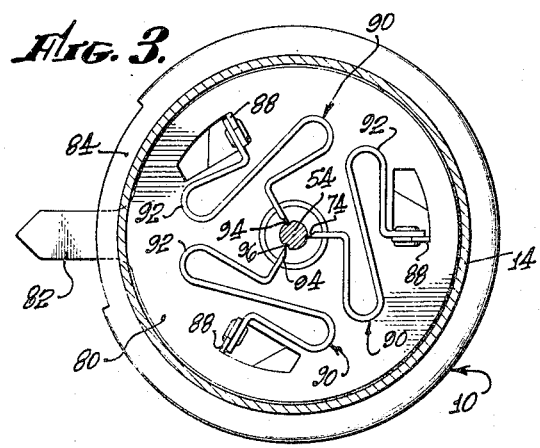
Fig. 3 is a transverse, sectional view taken on the broken line 3—3 of Fig. 1.

Fixedly secured to the lower extremity of the sensing element 32 by means of a rivet 48 is a control shaft 50, said shaft being composite in nature and being constituted by a substantially tubular upper portion 52 and a solid lower portion 54. A flat 56 is provided upon the upper extremity of the solid lower portion 54 of the shaft 50 and is received in a similarly flattened receptacle 58 provided in the lower extremity of the tubular upper portion 52 of the shaft 50, as best shown in Figs. 1, 7 and 9 of the drawings.

Mounted upon the lower extremity of the solid portion 54 of the shaft 50 is a carriage 60 which supports a switch element 62, the opposite extremities of which serve as movable contacts engageable with juxtaposed contacts 20-23.

The carriage 60 is secured to the shaft 50 by means of a pivot pin 64, said pivot pin being located perpendicularly to the axis of rotation of the shaft 50 and permitting rotation of the carriage 60 about an axis perpendicular to the axis of rotation of said shaft. The carriage 60 is formed from sheet metal, or the like, and is substantially U-shaped in configuration including two legs 66 which engage the pivot pin 64 and a base 68 in which is located a receptacle 70 for the switch element 62.

The receptacle 70, as best shown in Fig. 4 of the drawings, is constituted by an elongated slot 72 whose minimal width at the opposite extremities thereof is greater than the thickness of the switch element 62 to permit relative movement of said switch element with reference to the carriage 60.

Provided within the receptacle 70 is a pivot 74 which engages the switch element 62 and a compression spring 76 may be disposed opposite the pivot 74 for maintaining the switch element 62 in operative relationship therewith.

It is, therefore, obvious that the switch element 62 which supplies the movable contact engageable with the various fixed contacts 20-23 is movable with the carriage 60 about an axis perpendicular to the axis of rotation of the shaft 50 and is also movable within the receptacle 70 relative to said carriage about an axis which is substantially coincident with the axis of rotation of the shaft 50. Thus, when the switch element 62 has its opposite extremities seated on any pair of fixed contacts and rotation of the shaft 50 takes place to unseat the opposite extremities of said switch element from operative relationship therewith, initial rotation of the carriage 60 with respect to the switch element 62 takes place imparting sufficient inertia and speed to the carriage 60 to cause it to abruptly dislodge the opposite extremities of the switch element 62 from operative relationship with the contacts upon which they are engaged, thus eliminating arcing and other undesirable phenomena encountered in conventional switch constructions.

Furthermore, upon movement of the switch element into contact engaging position, the carriage 60 moves beyond the actual closure point of said element before coming to rest, and thus reduces bounce of said switch element upon the make.

Mounted within the portion 14 of the housing 12 and overlying the upper extremity of the terminal block 18 is a rotatable adjustment plate 80 which encompasses the lower portion 54 of the shaft 50 and which is provided with an integral adjusting tab 82 projecting through a slot 84 in the side of the portion 14 of the housing 12. The adjusting plate 80 is provided with a centrally located bushing 86 which encompasses the shaft 50 and facilitates the rotation of the plate 80 by the adjusting tab 82.

Mounted upon the upper surface of the adjusting plate 80 by means of lugs 88 formed thereupon is a plurality of sinuously shaped thrust members 90 constituted by snap springs 92 symmetrically arranged about the axis of rotation of the lower portion 54 of the shaft 50. The inner extremities of the snap springs 92 are provided with knife edges 94 engageable in corresponding openings or recesses 96 in the periphery of the lower portion 54 of the shaft 50.

It is obvious that the compressive effect of the inner extremities of the snap springs 92 upon the lower portion 54 of the shaft 50 can be adjusted by proper rotation of the adjusting plate 80 in the appropriate direction and that the adjustment of the snap springs 92 in this regard will determine the amount of torque which must be exerted upon the shaft 50 by the sensing element 32 in order to rotate the shaft 50 and the switch element 62 secured to the lower extremity thereof.

The snap springs 92 may be formed from spring material of conventional character such as spring steel, beryllium copper, or the like. Moreover, the snap springs 92 may be composed of condition sensing elements, as in United States Letters Patent No. 2,394,747, for the purpose of compensation for ambient conditions.

The inwardly directed thrust component exerted upon the lower portion 54 of the shaft 50 by the inner extremities of the snap springs 92 tends to resist rotation of the shaft 50 as induced by exposure of the sensing element 32 to temperature changes. As previously indicated, the snap springs 92 are assembled under longitudinal compression so that each of said springs exerts an inward thrust against the lower portion 54 of the shaft 50 of sufficient magnitude to require the imposition of considerable torque upon the shaft 50 by the sensing element 32 before rotation of the shaft 50 can be accomplished in spite of said inward thrust to cause snap action of the springs 92 to take place and to permit instantaneous rotation of the shaft 50 and the switch element 62 mounted thereupon.

It is apparent that, as gradually increasing torque is exerted upon the shaft 50 by the sensing element 32, there will be an increasing tendency of the shaft 50 to rotate, thus utilizing the inward force exerted by the springs 92 in a manner to effect a change in the tangential component thereof to assist the sensing element 32 in causing rotation of the shaft 50 to obtain a pronounced snap action upon the element 62.

The mode of operation of the thrust members 90 constituted by the snap springs 92 is described in greater detail in my previously issued United States Letters Patent No. 2,394,747 and reference is made thereto for further details concerning the same.

The terminal block 18 is provided with a cover 98 which is secured in operative relationship therewith by means of screw fasteners 100 and which covers the carriage 60 and the switch element 62 operatively associated therewith.

I thus provide by my invention a thermostatic control element which is characterized by its sensitivity of operation which is largely attributable to the coaction between the helically wound bimetallic strip constituting the sensing element of the control with the thrust members provided in association with the actuator shaft for the switch element. The precise settings which are obtained by the use of the control of my invention result from the opposition of the thrust members 90 to premature rotation of the actuator shaft of the control by the temperature sensing element associated therewith and also from the instantaneous manner in which the shaft is actuated once the inward thrust components of the thrust members are partially converted to tangential components causing instantaneous rotation of the actuator shaft.

The suspension of the opposite extremities of the shaft 50 between the sensing element 32 and the snap springs 92 results in the unimpeded rotation of the shaft 50 by said element and springs. It is also significant that, if the snap springs 92 are formed of bimetallic material they will affect the operation of the control by the sensing element 32.

Of considerable importance also is the provision of a uniquely mounted switch element constituting and providing the movable contacts of the switch of the control whereby arcing and other deleterious phenomena characteristic of prior art constructions are eliminated. Significant also is the provision of a unique means of fastening the temperature sensing element in operative relationship with the housing of the control.

I claim as my invention:

1. In a control, the combination of: a housing; a sensing element supported on said housing; a shaft connected at one extremity to said sensing element; a switch carriage mounted on the other extremity of said shaft for movement about an axis perpendicular to the axis of said shaft; and a switch element mounted in said carriage for movement therewith.

2. In a control, the combination of: a housing; a sensing element supported on said housing; a shaft connected at one extremity to said sensing element; a switch carriage mounted on the other extremity of said shaft for movement about an axis perpendicular to the axis of said shaft; and a switch element mounted in said carriage for movement therewith, said switch element being movable with respect to said carriage.

3. In a control, the combination of: a housing; a sensing element supported on said housing; a shaft connected at one extremity to said sensing element; a switch carriage mounted on the other extremity of said shaft for movement about an axis perpendicular to the axis of said shaft, said switch carriage having a receptacle therein and switch element locating means in said receptacle; and a switch element located in said receptacle in said carriage and supported on said locating means for relative movement with respect to said carriage.

4. In a control, the combination of: a housing; a helical sensing element supported in said housing; a shaft mounted for rotation in said housing by said sensing element and having one extremity connected to said sensing element; a switch carriage mounted on the other extremity of said shaft for movement about an axis perpendicular to the axis of said shaft; spring means engageable with said shaft adjacent said other extremity thereof tending to resist rotation of said shaft; and a switch element mounted in said carriage for movement therewith.

5. In a control, the combination of: a housing; a helical sensing element supported in said housing; a shaft mounted for rotation in said housing by said sensing element and having one extremity connected to said sensing element; a switch carriage mounted on the other extremity of said shaft for movement about an axis perpendicular to the axis of said shaft, said carriage including switch element locating means therefor; spring means engageable with said shaft adjacent said other extremity thereof tending to resist rotation of said shaft; and a switch element mounted on said locating means in said carriage for movement with respect to and with said carriage.

6. In a control, the combination of: a sensing element constituted by a helically wound, bimetallic strip; a shaft having one extremity connected to one extremity of said element for rotation thereby; a switch element connected to the other extremity of said shaft; and means impinging on said shaft intermediate said extremities and resisting movement of said shaft by said element until said element generates sufficient torque to overcome the resistance of said means, said means being constituted by a plurality of fixed spring members whose inner ends impinge on said shaft.

7. In a control, the combination of: a sensing element for generating a torque proportional to a condition to which said element is responsive; a rotatable connector having one extremity fastened to said sensing element; a switch mounted on the other extremity of said connector; and spring means symmetrically arranged about said connector intermediate said extremities and engaging the same to resist rotation of said connector until the torque generated by said sensing element exceeds the resistive effect of said spring means.

8. In a control, the combination of: a sensing element for generating a torque proportional to a condition to which said element is responsive, said sensing element being constituted by a helically wound bimetallic strip; a rotatable connector having one extremity fastened to said sensing element; a switch element mounted on the other extremity of said connector; and spring means symmetrically arranged about said connector intermediate said extremities and engaging the same to resist rotation of said connector until the torque generated by said sensing element exceeds the resistive effect of said spring means.

9. In a control, the combination of: a sensing element for generating a torque proportional to a condition to which said element is responsive; a rotatable connector having one extremity fastened to said sensing element; a switch element mounted on the other extremity of said connector; and snap acting spring means symmetrically arranged about said connector intermediate said extremities and engaging the same to resist rotation of said connector until the torque generated by said sensing element exceeds the resistive effect of said spring means.

10. In a control, the combination of: a sensing element for generating a torque proportional to a condition to which said element is responsive, said sensing element being constituted by a helically wound bimetallic strip; a rotatable connector having one extremity fastened to said sensing element; a switch element mounted on the other extremity of said connector; and snap acting spring means symmetrically arranged about said connector intermediate said extremities and engaging the same to resist rotation of said connector until the torque generated by said sensing element exceeds the resistive effect of said spring means.

11. In a switch construction, the combination of: a rotatable shaft; a carriage mounted for pivotal movement on said shaft about an axis perpendicular to the axis of rotation of said shaft, said carriage having a receptacle therein; and a switch element mounted for movement with respect to said receptacle about an axis substantially coincident with the axis of rotation of said shaft.

12. In a switch construction, the combination of: a rotatable shaft; a carriage mounted for pivotal movement on said shaft about an axis perpendicular to the axis of rotation of said shaft, said carriage having a receptacle therein, said carriage having switch element locating means in said receptacle; and a switch element mounted on said locating means for movement with respect to said receptacle about an axis substantially coincident with the axis of rotation of said shaft.

13. In a switch construction, the combination of: a rotatable shaft; a carriage mounted for pivotal movement on said shaft about an axis perpendicular to the axis of rotation of said shaft, said carriage having a receptacle therein; and a switch element mounted in said receptacle for movement relative to said carriage.

14. In a switch construction, the combination of: a rotatable shaft; a carriage mounted for pivotal movement on said shaft about an axis perpendicular to the axis of rotation of said shaft, said carriage having a receptacle therein and switch element locating means in said receptacle constituted by a pivot located therein; and a switch element mounted on said pivot for movement with respect to said receptacle about an axis substantially coincident with the axis of rotation of said shaft.

15. In a switch construction, the combination of: a rotatable shaft; a carriage mounted for pivotal movement on said shaft about an axis perpendicular to the axis of rotation of said shaft, said carriage having a receptacle therein and switch element locating means in said receptacle constituted by a pivot and a spring located therein; and a switch element mounted between said pivot and said spring for movement with respect to said receptacle about an axis substantially coincident with the axis of rotation of said shaft.

References Cited in the file of this patent

UNITED STATES PATENTS

| | | |
|---|---|---|
| 2,225,982 | Clark | Dec. 24, 1940 |
| 2,231,686 | Shaw | Feb. 11, 1941 |
| 2,235,779 | Van Dusen | Mar. 18, 1941 |